United States Patent [19]
Bertram et al.

[11] Patent Number: 5,709,317
[45] Date of Patent: Jan. 20, 1998

[54] HAND HELD DISPENSER FOR FOAMABLE COMPOSITIONS AND DISPENSING SYSTEM

[75] Inventors: George T. Bertram, Newtown; John J. Corrigan, III, Washington; Patrick S. Lacombe, Sandy Hook; Michael R. Knaak, New Fairfield, all of Conn.

[73] Assignee: Sealed Air Corporation, Saddle Brook, N.J.

[21] Appl. No.: 680,371

[22] Filed: Jul. 15, 1996

Related U.S. Application Data

[63] Continuation of Ser. No. 361,322, Dec. 21, 1994, Pat. No. 5,590,816.

[51] Int. Cl.$^6$ ........................ B67D 5/60
[52] U.S. Cl. .............. 222/135; 222/145.1; 222/323; 222/333; 239/412
[58] Field of Search ............... 222/135, 145.1, 222/323, 325, 333, 504, 529; 239/343, 412, 526

[56] References Cited

U.S. PATENT DOCUMENTS

| | | |
|---|---|---|
| 3,236,419 | 2/1966 | Remer. |
| 3,302,891 | 2/1967 | Faro et al. . |
| 3,687,370 | 8/1972 | Sperry. |
| 3,837,575 | 9/1974 | Lehnert. |
| 3,945,569 | 3/1976 | Sperry. |
| 3,984,033 | 10/1976 | Groth et al. . |
| 4,023,733 | 5/1977 | Sperry. |
| 4,033,481 | 7/1977 | Hicks et al. . |
| 4,117,551 | 9/1978 | Books et al. . |
| 4,129,231 | 12/1978 | Larson. |
| 4,159,079 | 6/1979 | Phillips, Jr. . |
| 4,262,847 | 4/1981 | Stitzer et al. . |
| 4,426,023 | 1/1984 | Sperry et al. . |
| 4,440,320 | 4/1984 | Wernicke. |
| 4,469,251 | 9/1984 | Sperry et al. . |
| 4,568,003 | 2/1986 | Sperry et al. . |
| 4,674,268 | 6/1987 | Gavronsky et al. . |
| 4,676,437 | 6/1987 | Brown. |
| 4,708,292 | 11/1987 | Gammons. |
| 4,762,253 | 8/1988 | Palmert. |
| 4,800,708 | 1/1989 | Sperry. |
| 4,854,109 | 8/1989 | Pinarer et al. . |
| 4,913,317 | 4/1990 | Wernicke. |
| 4,925,107 | 5/1990 | Brown. |
| 4,993,596 | 2/1991 | Brown. |
| 5,005,765 | 4/1991 | Kistner. |
| 5,027,975 | 7/1991 | Keske et al. . |
| 5,050,776 | 9/1991 | Rosenplanter. |
| 5,104,006 | 4/1992 | Brown. |
| 5,129,581 | 7/1992 | Braun et al. . |
| 5,186,905 | 2/1993 | Bertram et al. . |
| 5,215,226 | 6/1993 | Bertram et al. . |
| 5,242,115 | 9/1993 | Brown. |
| 5,265,761 | 11/1993 | Brown. |
| 5,339,991 | 8/1994 | Snyder. |
| 5,590,816 | 1/1997 | Bertram et al. ............ 222/135 |

FOREIGN PATENT DOCUMENTS

| | | |
|---|---|---|
| 0 500 272 | 8/1992 | European Pat. Off. . |
| 2 532 561 | 3/1984 | France . |
| 2 589 784 | 5/1987 | France . |

OTHER PUBLICATIONS

International Search Report for PCT/US95/16442 filed Dec. 15, 1995 dated Mar. 28, 1996.

*Primary Examiner*—Philippe Derakshani
*Attorney, Agent, or Firm*—Bell Seltzer Intellectual Property Law Group of Alston & Bird LLP

[57] ABSTRACT

A hand held dispenser for dispensing foamable compositions is disclosed that is particularly useful for foam-in-place packaging systems. The hand held dispenser comprises a housing; a motor in the housing; a transmission in the housing and driven by the motor; and a valving cartridge in the housing and driven by the transmission for dispensing foamable compositions upon demand. The motor is positioned below the valving cartridge for providing a clear line of sight along the top of the housing.

13 Claims, 4 Drawing Sheets

HAND HELD DISPENSER FOR FOAMABLE COMPOSITIONS AND DISPENSING SYSTEM

This application is a continuation of Ser. No. 08/361,322 filed Dec. 21, 1994 now U.S. Pat. No. 5,590,816, issued Jan. 7, 1997.

FIELD OF THE INVENTION

This invention relates to cushioned packaging apparatus and techniques and, in particular, relates to a device for forming foam cushioning of the type in which a foamable composition is dispensed into a container that carries an object to be cushioned. The foamable composition generates gases while hardening so that the result is a container filled with hardened foam that surrounds the packaged object in customized fashion.

BACKGROUND OF THE INVENTION

The present invention relates to the use of foamable compositions for packaging purposes. In a number of packaging applications, fragile articles or those otherwise needing protection from undesired movement or breakage, particularly items with irregular shapes and sizes, have been packed in loose, friable or dunnage-type materials or in protective foamed polymer packaging materials, such as injection molded styrofoam, styrofoam chips, or other similar materials.

The present invention relates to foam-in-place packaging. Foam-in-place packaging is a useful alternative for packaging fragile or other items.

One technique for packaging articles in foam comprises generating the foam in place while the articles are being packaged. For example, when certain chemicals are mixed, they form polymeric products while at the same time generating gases, such as carbon dioxide and water vapor. If such chemicals are selected as being those that harden relatively quickly, they can be used to form hardened polymer foams in which the foam is produced by the gaseous carbon dioxide and water vapor leaving the mixture as it hardens. Typical foamable compositions include urethane precursors which, when mixed, generate polyurethane, carbon dioxide, and water vapor. As the urethane forms and hardens, these gases are concurrently generated so that by the time the urethane sets (generally a relatively short period of a few minutes or less) it takes the form of a polymer foam that has expanded to fill the void spaces in the container and to thereby cushion the item being packaged.

One technique for foam-in-place packaging is to place the object to be packaged in a container, cover it with a polymer film or other material which will protect it from liquids, inject a certain amount of foamable composition into the remainder of the container, and then close the container. As the composition foams, it fills the remainder of the container, forming a custom-shaped foam cushion surrounding the article.

For larger volume packaging operations, i.e., those requiring a number of foam protective packages to be made in relatively rapid succession, a number of automated devices have been developed and are assigned to the assignee of the present invention. Exemplary devices are described and claimed in U.S. Pat. Nos. 4,674,268; 4,800,708; and 4,854,109.

In other circumstances, however, the need for foam-in-place packaging still exists, but the use of automated machinery is unnecessary or undesired from a cost, efficiency, or other standpoint. In such circumstances, foam-in-place packaging can be accomplished with a supply of foamable chemicals, usually two, and an injection dispenser connected to the supplies of the respective chemicals. The chemicals are mixed within the gun to form the foamable composition. Examples of earlier versions of such guns include those described in U.S. Pat. Nos. 3,687,370; 3,945,569; 4,023,733; 4,159,079; and 4,426,023.

One of the more recently successful versions of such a hand-held packaging system is the INSTAPAK® 808/870 foam packaging systems from Sealed Air Corporation's Instapak Division in Danbury, Conn. The "808" system represented a significant improvement in hand-held devices, primarily because of its use of an electric motor, rather than a pneumatic pumping system, and its incorporation of a number of significant features that are the subjects of other commonly-assigned patents.

In an effort to enhance the 808 systems, however, various features were identified that could be subject to such improvement. For example, the hand-held dispenser or "gun" portion of the 808 system is formed of metal. The metal adds significant weight to the hand-held portion, a factor which can increase operator fatigue and tend to lower efficiency. Metal can also be more expensive than alternative materials, and requires particular tooling and fabricating equipment.

Additionally, the electric motor driving the 808 dispenser is located above the injection cartridge. As a result, in close circumstances, it can block the operator's view of the opening of the injection cartridge from which the foamable compositions exit.

Accordingly, in an effort to offer further improvements to this device, and to foam dispensers in general, there exists the need for a more ergonomically satisfactory dispenser, and one of reduced weight, and which maintains the significant advantages of the 808 system, but which offers significant improvements as well.

OBJECTION AND SUMMARY OF THE INVENTION

Therefore, it is an object of the present invention to provide a series of improvements in foam dispensing systems of this type.

The invention meets this object with a system for dispensing foamable compositions that includes a hand-held dispenser for dispensing foamable compositions, and that is particularly useful for foam-in-place packaging systems. The dispensing system comprises a pump for pumping foamable compositions from a supply to a dispenser; a hose connected to the pump for carrying foamable compositions from the pump; and a hand-held dispenser connected to the hose. The hand-held dispenser in turn comprises a housing, a motor in the housing, a transmission in the housing driven by the motor, and a valving cartridge in the housing driven by the transmission for dispensing foamable compositions upon demand. In particular, the motor is positioned below the valving cartridge and provides an ergonomically superior clear line of sight along the top of the housing.

The foregoing and other objects and advantages of the invention, and the manner in which the same are accomplished, will be more readily understood when taken in conjunction with the accompanying detailed description and drawings in which:

DETAILED DESCRIPTION

The present invention is a system for dispensing foamable compositions that includes a hand-held dispenser for dispensing the foamable compositions and that is particularly useful for foam-in-place packaging systems.

Figure 1:
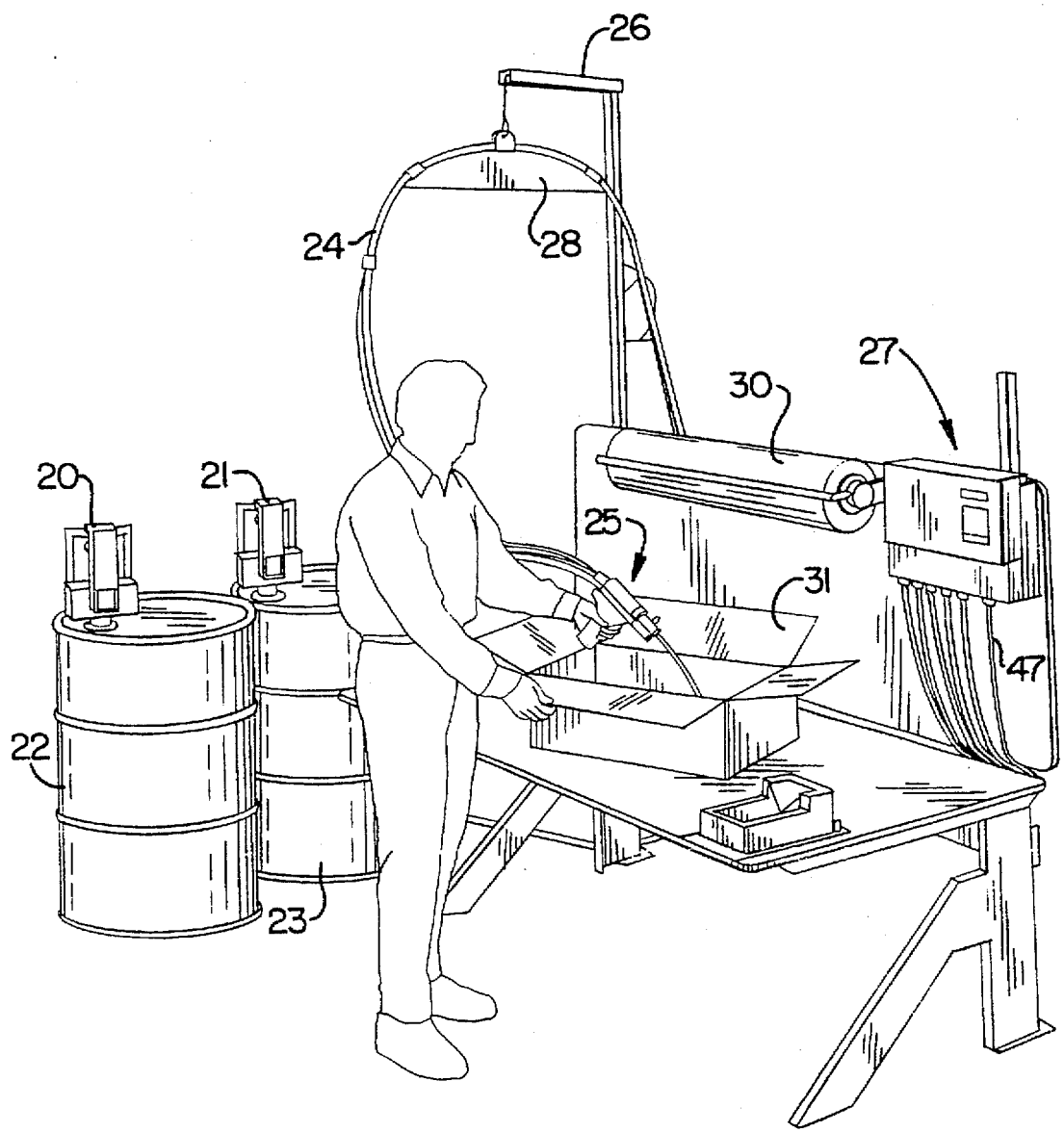
FIG. 1 is a perspective view of a dispenser system according to the present invention in typical use.

FIG. 1 gives a good overall perspective view of a typical installation and use of such a system. FIG. 1 shows two pumps 20 and 21 that pump foamable composition from the respective supply drums 22 and 23. As known by those familiar with foaming systems, a typical polyurethane foam is formed from precursors of an isocyanate and a polyol, and thus a system according to the present invention will commonly include two pumps, one for each of the precursor chemicals. A pair of hoses which are generally strapped together and are designated herein by the single reference 24 extend from the supply pumps 20 and 21 to a hand-held dispenser broadly designated at 25. As illustrated in FIG. 1, the hoses 24 are preferably maintained above the floor for ease of movement and overall safety, and are held in place by a hose hanger 28 which is shown supported from the bracket 26.

The dispensing system further comprises an electronic controller broadly designated at 27 which is remote from both the pump and the dispenser and will be described in more detail further herein.

As FIG. 1 illustrates, a typical use of the system by an operator comprises selecting a portion of plastic sheet material from the roll 30 and using it to line a container, such as the cardboard box 31. A fragile object can be placed in the box and either wrapped or draped with some of the film from the roll 30, after which a certain portion of foam is dispensed into the container. When the container is then closed and sealed, the foamable composition generates the cured, hardened foam which, because it was originally dispensed as a liquid, expands, occupies and takes the shape of the empty portion of the container to thus form a custom foam cushion around the fragile object.

Figure 2:
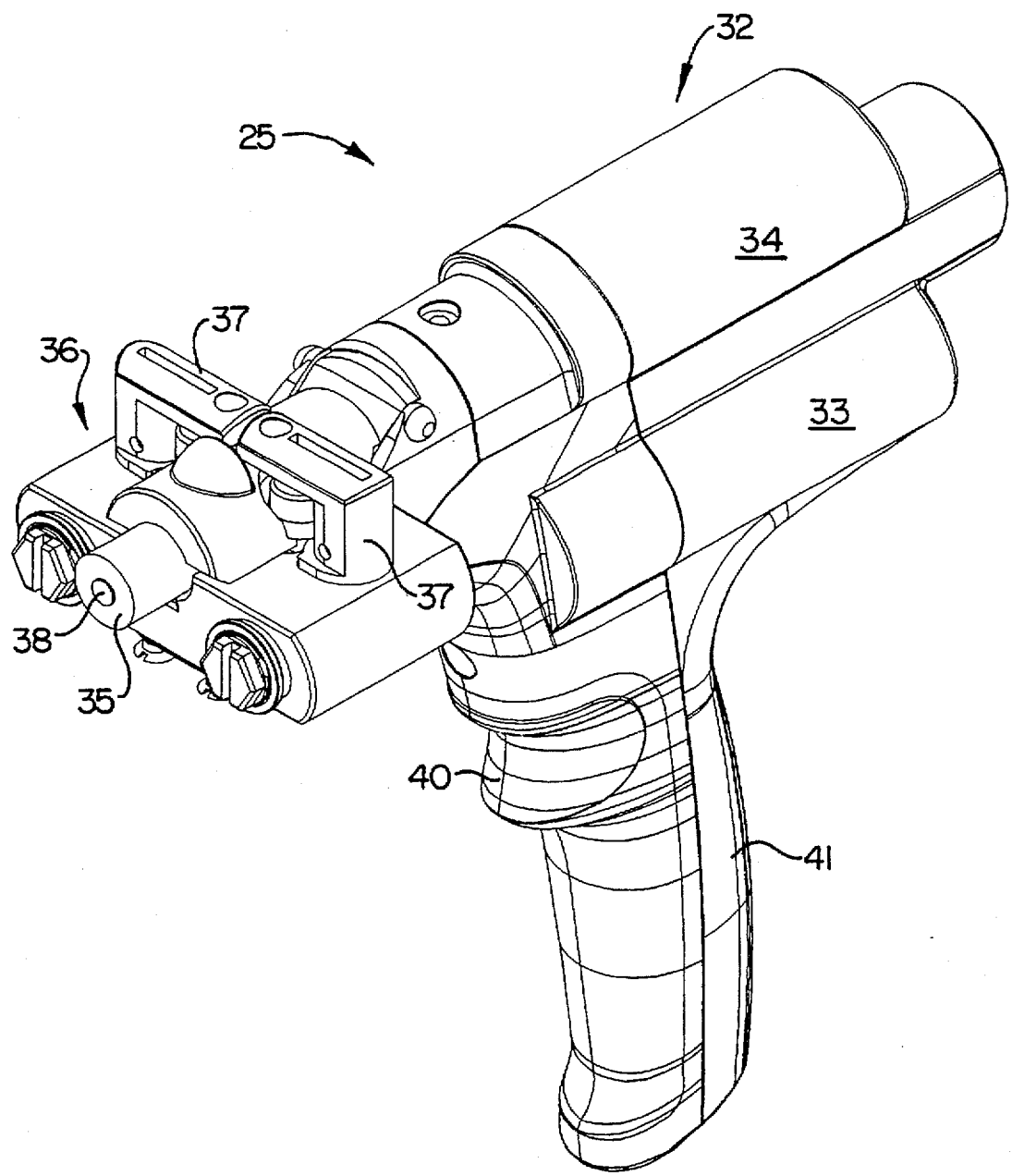
FIG. 2 is a perspective view of the dispenser according to the present invention.

FIG. 2 is a perspective view of the dispenser 25 according to the present invention. The dispenser comprises a housing broadly designated at 32, a motor 33 in the housing, a transmission 34 in the housing and driven by the motor, and a valving cartridge 35 in the housing 32 and driven by the transmission 34 for dispensing foamable compositions upon demand. The motor 33 is positioned below the valving cartridge 35 for providing a clear line of sight along the top of the housing. As can be understood with respect to FIG. 1, such a clear line of sight is of significant advantage to an operator of the dispenser and the overall dispensing system.

The valving cartridge 35 is readily and easily detachable from the valving clamp assembly 36. The design and operation of detachment are described in commonly-assigned U.S. Pat. No. 4,469,251 to Sperry et al. which is incorporated entirely herein by reference. The design and operation of the valving cartridge 35 are described in detail in commonly-assigned U.S. Pat. No. 4,568,003 to Sperry et al. which is likewise incorporated entirely herein by reference.

Figure 3:
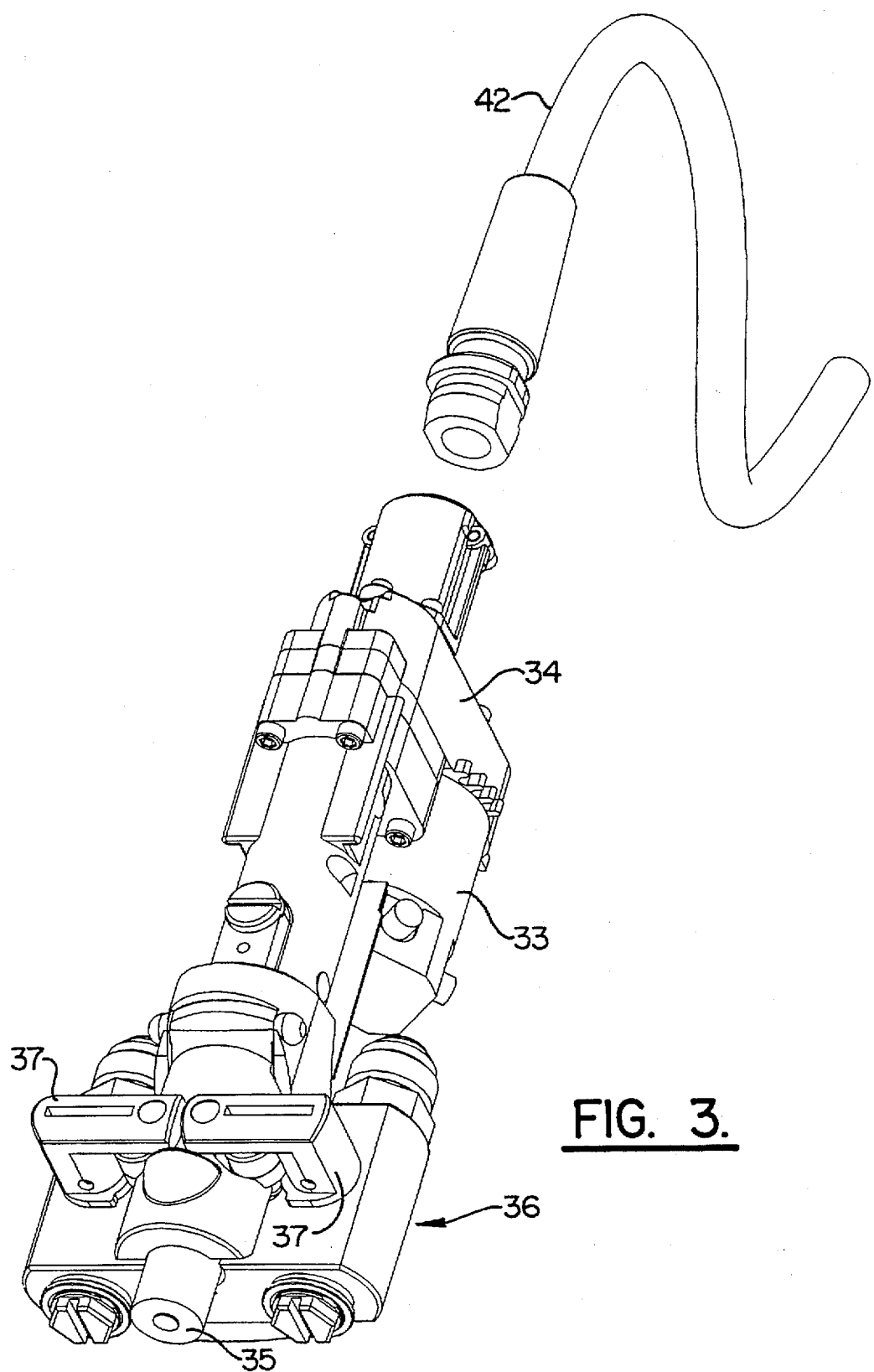
FIG. 3 is a partially isolated perspective view of certain working portions of the dispenser according to the present invention.

FIGS. 2 and 3 illustrate that the dispenser 25 further comprises means shown as the valving clamp assembly 36 for delivering foam precursors to the valving cartridge 35. The design and operation of the valving clamp assembly 36 are described in great detail in commonly-assigned U.S. Pat. No. 5,215,226 to Bertram et al. which is incorporated entirely herein by reference. As shown therein, the cartridge 35 is typically designed to be removable from the valving clamp assembly 36. In order to prevent the foam from being dispensed when the cartridge 35 is not properly in place, the design of the clamp 36 requires that the handles 37 (and thus the flow of precursors) be turned off before the cartridge 35 can be removed. Alternatively, before fluids can flow back into the cartridge 35, the clamp handles 37 must be rotated back into their clamping position.

FIG. 1 illustrates the hoses 24 connected to the dispenser 25. The hoses are not shown in FIGS. 2 and 3 for the sake of clarity, but they connect to the rear portions of the valving clamp assembly 36. Accordingly, the valving cartridge 35 further comprises a mixing chamber along with means for separately delivering two foam precursors to the mixing chamber. The mixing chamber and the entry ports to it are likewise discussed in significant detail in commonly-assigned U.S. Pat. No. 5,186,905 to Bertram et al. which is likewise incorporated entirely herein by reference.

The motor 33 is most preferably an electric motor, and indeed one of the advantages of the system is its potential for all-electric operation. A trigger 40 initiates the motor to drive the transmission 34 and the valving cartridge 35.

As best illustrated in FIG. 2, the housing 32 comprises an upper portion that extends generally longitudinally parallel to the axis of the valving cartridge 35 and a lower portion extending generally perpendicularly downwardly from the upper portion and forming a handle 41 for the housing 32 of the dispenser 25. The housing 32 is preferably formed of an appropriate engineering plastic of which there are a number of appropriate selections. As commonly used in this art, the term "engineering plastic" refers to polymers that exhibit "hardness, strength, machinability, dimensional stability, non-flammability and resistance to corrosion, most acids, solvents and heat." Lewis, *Hawley's Condensed Chemical Dictionary*, 12th Ed. (1993).

In preferred embodiments, the housing 32 is formed of several pieces so that it can be quickly and easily replaced for service reasons without disassembling the entire dispenser. Taken together, FIGS. 2 and 3 illustrate that the rear portion of the housing 32 carries the motor 33 and the transmission 34 and form the backbone assembly of the dispenser 25. Thus, the rear portion of the housing 32 conveniently contains most of the essential mechanical elements of the dispenser.

In relating the positions of the motor 33 to the transmission 34 and the valving cartridge 35, it will be noted that the valving cartridge 35 is a cylinder with an axial valving rod 38. Accordingly, in the preferred embodiment of the invention, the motor 33 is positioned below the longitudinal axis of the cylindrical valving cartridge.

FIG. 3 shows some additional details of the dispenser 25 with the housing 32 and some other features removed. First, FIG. 3 illustrates an electrical power cord 42 and its appropriate connection to the rear of the dispenser 25. The motor 33 is illustrated in more detail in FIGS. 3 and 4 which show that the functional portions of the transmission are rearward of the motor. FIG. 3 also more clearly shows the relationship of the motor as being below the axis of the valving cartridge 35.

Figure 4:
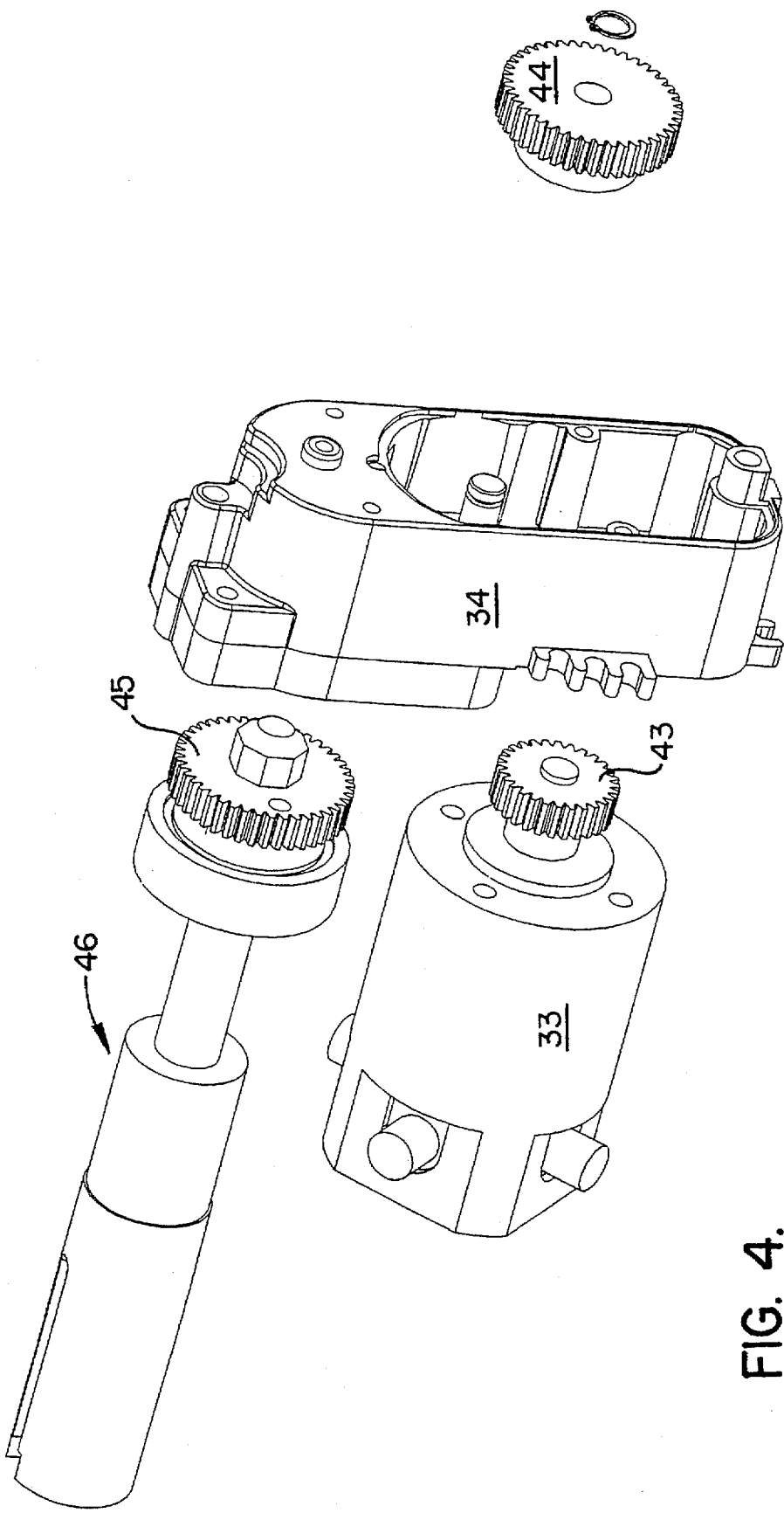
FIG. 4 is an exploded perspective view of the motor and the transmission portions according to the present invention.

FIG. 4 shows the motor 33, a drive gear 43, a driven gear 44 for the transmission 34, which in turn drives another gear 45 on a composite shaft broadly designated at 46. The shaft 46 is in turn attached to the valving cartridge 35 in a manner typical of these devices and which will not otherwise be described in detail.

The overall dispensing system comprises a number of additional features. First, as noted earlier and illustrated in FIG. 1, the system comprises the electronic controller 27 which is remote from the pump and remote from the dispenser. The controller will typically comprise a main board and a power management board. The main board is that portion of the circuitry which controls the electrical operation of the pumps, hoses, and dispenser. In turn, the power management board converts available electric power into the frequency and voltage required by the main board.

Four power management boards are exemplary of this objective: single phase, 50 or 60 cycles (Hz), 170 to 265 volts (alternating current, "$V_{ac}$"), and 30 amps (predominantly North America); three phase "delta" configuration, 50–60 Hz, 170 $V_{ac}$ phase to phase, 30 amps each phase (predominantly North America); three phase "delta" configuration, 50–60 Hz, 170 $V_{ac}$ phase to phase, 20 amps each phase (some areas in Europe); and three phase "Y" configuration, 50 or 60 Hz, 170–265 $V_{ac}$, phase to neutral, 16 amps each phase (predominantly Europe, Pacific Rim, and Far East). The power management board distributes a specific electrical phase configuration into one standard configuration designed for the control board.

The board controls portions of the dispenser and the pump, and also provides electric current to the hoses 24 for heating the hoses to maintain a foamable composition at an elevated temperature (and thus more fluid) in the hoses.

Accordingly, the pumps 20 and 21 are typically electrically driven and electrically controlled, and thus the dispensing system includes the respective cables shown at 47 in FIG. 1.

As a particular advantage of the invention, however, the pumps 20 and 21 further comprise their own electronic pump controls. By placing a portion of the pump controls at the pumps, the extent to which the pump must be controlled by signals transmitted between the pumps 20 and 21 and the controller 27 are greatly reduced which in turn greatly reduces the radio frequency (RF) interference produced by signal traffic between the pumps 20 and 21 and the controller 27. As known to those in various engineering fields, the reduction of such RF interference is mandatory in many countries.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A hand held dispenser for dispensing foamable compositions and that is particularly useful for foam-in-place packaging systems, said hand held dispenser comprising:
    a housing;
    a motor in said housing;
    a valving cartridge in said housing and driven by said motor for dispensing foamable compositions upon demand;
    said motor being positioned below said valving cartridge for providing a clear line of sight along the top of said housing.

2. A dispenser according to claim 1 wherein said valving cartridge is removably attached to said transmission.

3. A dispenser according to claim 1 and further comprising a clamping device for securing said valving cartridge to said housing.

4. A dispenser according to claim 1 and further comprising means for delivering foam precursors to said valving cartridge.

5. A dispenser according to claim 1 wherein said valving cartridge further comprises a mixing chamber, and said dispenser further comprises means for separately delivering two foam precursors to said mixing chamber.

6. A dispenser according to claim 1 wherein said motor comprises an electric motor.

7. A dispenser according to claim 1 and further comprising a trigger for initiating said motor to drive said transmission and said valving cartridge.

8. A dispenser according to claim 1 wherein said housing comprises an upper portion that extends generally longitudinally parallel to the axis of said valving cartridge and a lower portion extending generally perpendicularly downwardly from said upper portion and forming a handle for said housing and said dispenser.

9. A dispenser according to claim 8 wherein said housing is formed of an engineering plastic.

10. A dispenser according to claim 1 and further comprising a transmission in said housing driven by said motor and in driving relationship with said valving cartridge for driving said cartridge to dispense foamable compositions upon demand.

11. A dispenser according to claim 10 wherein said valving cartridge comprises a cylinder with an axial valving rod.

12. A dispenser according to claim 11 wherein said motor is positioned below the longtudinal axis of said cylindrical valving cartridge.

13. A dispenser according to claim 11 wherein said transmission comprises:
    a drive gear driven by said motor;
    a transmission gear driven by said drive gear;, and
    a shaft gear on said cartridge and driven by said transmission gear for driving said cartridge.

* * * * *